S. TRUAX.
METHOD FOR THE TREATMENT OF ZINC ORE OR ZINC BEARING MATERIAL.
APPLICATION FILED DEC. 16, 1910.
1,155,628. Patented Oct. 5, 1915.
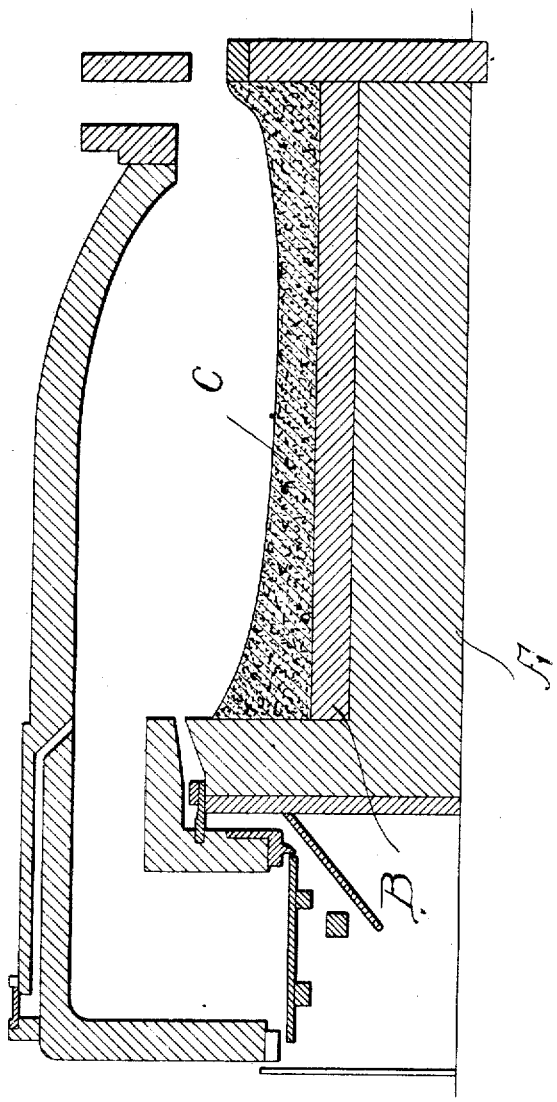
Witnesses:
Sewall Truax  Inventor
By his Attorneys

UNITED STATES PATENT OFFICE.

SEWALL TRUAX, OF CANON CITY, COLORADO, ASSIGNOR TO GRANADENA MINING COMPANY, A CORPORATION OF ARIZONA.

METHOD FOR THE TREATMENT OF ZINC ORE OR ZINC-BEARING MATERIAL.

1,155,628.  Specification of Letters Patent.  Patented Oct. 5, 1915.

Application filed December 16, 1910. Serial No. 597,660.

*To all whom it may concern:*

Be it known that I, SEWALL TRUAX, a citizen of the United States, and a resident of Canon City, county of Fremont, and State of Colorado, have invented a certain new and useful Method for the Treatment of Zinc Ore or Zinc-Bearing Material, of which the following is a specification.

My invention is a method for the treatment of zinc ore or zinc-bearing material, and deals especially with the treatment of slags containing zinc resulting from previous or contemporary smelting of zinc lead-ores.

In practising the method according to my invention, I employ a receptacle for the melted zinc-bearing slag, the bottom of which, or any part of which located beneath the surface of the slag, is formed of a reducing material capable of reducing zinc from zinc oxid or zinc silicate contained in the slag. The melted slag may be that drawn directly from a smelting furnace, or if hard zinc-slag, it is melted before being subjected to the process, the melting taking place in a separate furnace, or if the slag is clean and of a good quality, the melting may take place in the receptacle containing the reducing material. The heat necessary to promote the reaction between the zinc oxid or silicate and the reducing material may be supplied in a number of ways, either continuously, while the reaction is taking place, or intermittently as the temperature may drop below the temperature of reaction. For instance, I may preheat the slag to a temperature above that at which the reaction of the reducing material and the zinc compound takes place and thus remove a portion or all of the zinc contained in the slag. Experiments show that with as high a temperature as it is practical to preheat slag in a reverberatory furnace, using oil as fuel, that about 2% (or ... of zinc per ton) of ordinary slag may be ... before the temperature drops below the temperature at which the reaction takes place, and consequently the reaction ceases. I may then reheat the slag and repeat the operation until the zinc is removed to as low a point as is economical. Experiments indicate that the zinc above .5 per cent to .6 per cent of the weight of the slag is readily removed.

I may supply the necessary heat continuously by burning fuel, preferably oil or gas, in the furnace during the period that the reaction is taking place.

I may apply the necessary heat by electricity or in any other known manner. I prefer to employ two or more reducing furnaces, as I shall designate the apparatus in which the removal of the zinc is accomplished, for each melting furnace, so that one may be repaired and the bottom or lining of reducing material renewed while another is in use, so that no interruption of the process takes place.

Any material capable of acting in a reducing manner on the zinc compounds in melted slag may be employed, provided it can be made sufficiently strong by the aid of a binder and baking to act as a "bottom" in a reverberatory furnace or a lining of the apparatus used in this process. As the reducing material I prefer to use a mixture of fine coke and clay which is rammed into place and consolidated by heat into a hard mass. One good mixture consists of coke of graduated sizes from a maximum of one inch pieces down to fine dust, in such proportions that there is sufficient of each to fill the interstices of the next larger size, thus giving the greatest possible weight per unit volume. The maximum amount of plastic clay sufficient to act as a binder is added and well mixed, while dry with the coke. 25% is sufficient in some cases. The mixture is then slightly dampened only enough so that it can be formed into coherent balls in the hands, then placed in position, rammed to the form desired for the bottom or lining and dried and consolidated into place by means of heat. Loose coke is preferably spread over the surface before baking to prevent the consumption of the coke in the lining. The smelting operation is conducted directly on this bottom, or in contact with the lining.

I may employ any form of furnace which will accomplish the desired result, for instance, the well-known form of reverberatory furnace such as I have illustrated in the annexed drawing, in which A designates the body of the furnace, in which the hearth B is provided with a lining C of the reducing material, which is preferably basin-shaped so as to properly hold the melted slag.

The great difficulty met with in treating this material in the past has been that of getting sufficiently close or intimate contact between the material treated and the reducing agent. This has been accomplished in the past by means of fine grinding of the materials and mixing of the two.

I accomplish the result by treating a fluid material (slag) containing the zinc, by reducing material at the bottom of the mass, with the result that not only good contact is secured between the slag and carbon of the coke, but also that the carbon monoxid formed by the action of carbon on zinc oxid, or zinc silicate, rises in small bubbles through the melted mass and comes into intimate contact with a further portion of zinc oxid or silicate liberating metallic zinc and producing carbon dioxid which gas rises and passes off with the vapors of zinc, and at a lower temperature oxidizes the zinc again to oxid in case no free oxygen is present. Usually oxygen is present in the atmosphere of the furnace and so zinc oxid and carbon dioxid are given off in the vapors. The third step is to collect the zinc oxid. This zinc oxid is preferably caught in a "bag house" by filtering through cloth, in a well known manner and utilized as a pigment, or as a source of metallic zinc by well known methods of treatment. The reducing bottom or lining is corroded and consumed by the action of the zinc compounds in the slag, the carbon of the coke passes off in gaseous form and the clay is taken up by the slag. The consumption of coke or carbon is about one-fifth or 20% of the zinc driven off, or in the case of slag containing 10% of zinc, the consumption of coke is about 2% of the weight of slag treated. This carbon is replaced by repairing or "claying" the sides of the furnace, in the usual manner practised in ordinary reverberatory smelting of copper ores, except that the material used is the clay and coke mixture instead of sand or silicious ores as used in copper smelting. After a time the bed becomes so corroded that a new bottom must be put in.

Having thus described my invention, what I claim as new and desire to secure by Letters Patent is:—

1. The herein described method of treating slag containing zinc comprising maintaining the slag in a fluid condition in contact with a body of finely divided reducing material, the particles of which are prevented from passing into the fluid.

2. The herein described method of treating slag containing zinc comprising melting the slag, depositing the fluid slag on a solid body of finely divided carbon reducing material and a binder that prevents the particles of reducing material from passing into the fluid, and maintaining the slag in fluid condition.

3. The herein described method of treating zinc bearing material comprising maintaining the material in a fluid condition with the lower portion thereof in contact with a carbon reducing material, that is prevented from passing up through the fluid, and permitting the gaseous carbon monoxid to bubble up through the fluid mass and extend to the upper portions thereof in being converted into carbon dioxid.

4. The herein described method of treating zinc bearing material comprising smelting the material to a fluid condition in contact with finely divided reducing material, the particles of which are prevented from passing into the fluid.

5. The herein described method of treating slag containing zinc comprising melting the slag, depositing the molten mass on a bed composed of finely divided coke and a clay binder that prevents the particles of coke from passing into the fluid, and maintaining the slag in fluid condition.

In testimony whereof I have signed my name to this specification in the presence of two subscribing witnesses.

SEWALL TRUAX.

Witnesses:
M. E. McNINCH,
C. G. HEYLMUN.

It is hereby certified that in Letters Patent No. 1,155,628, granted October 5, 1915, upon the application of Sewall Truax, of Canon City, Colorado, for an improvement in "Methods for the Treatment of Zinc Ore or Zinc-Bearing Materials," an error appears in the printed specification requiring correction as follows: Page 1, line 84, for the word "maximum" read *minimum;* and that the said Letters Patent should be read with this correction therein that the same may conform to the record of the case in the Patent Office.

Signed and sealed this 9th day of November, A. D., 1915.

[SEAL.]

J. T. NEWTON,

*Acting Commissioner of Patents.*